US012386570B2

(12) United States Patent
Komazawa et al.

(10) Patent No.: US 12,386,570 B2
(45) Date of Patent: Aug. 12, 2025

(54) PRINTING SYSTEM, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventors: Hisao Komazawa, Kanagawa (JP); Koji Takahata, Kanagawa (JP); Satoshi Misawa, Kanagawa (JP); Koh Tanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 442 days.

(21) Appl. No.: 17/739,152

(22) Filed: May 8, 2022

(65) Prior Publication Data
US 2023/0121550 A1 Apr. 20, 2023

(30) Foreign Application Priority Data
Oct. 18, 2021 (JP) .................................. 2021-170288

(51) Int. Cl.
*G06F 3/12* (2006.01)
(52) U.S. Cl.
CPC .......... *G06F 3/1243* (2013.01); *G06F 3/1204* (2013.01); *G06F 3/1205* (2013.01)
(58) Field of Classification Search
None
See application file for complete search history.

(56) References Cited

U.S. PATENT DOCUMENTS

| | | | | |
|---|---|---|---|---|
| 8,186,272 | B2 * | 5/2012 | Reichelsheimer | F26B 25/22 |
| | | | | 101/484 |
| 8,864,266 | B2 * | 10/2014 | Suzuki | B41J 2/2125 |
| | | | | 347/15 |
| 2017/0282590 | A1 * | 10/2017 | Ozawa | B41J 11/007 |
| 2018/0032849 | A1 * | 2/2018 | Nakata | G06K 15/1864 |
| 2020/0019353 | A1 | 1/2020 | Okajima | |
| 2023/0064686 | A1 * | 3/2023 | Shinnae | G06T 7/0004 |

FOREIGN PATENT DOCUMENTS

| | | |
|---|---|---|
| JP | 2003136818 | 5/2003 |
| JP | 201200876 | 1/2012 |
| JP | 2020006603 | 1/2020 |
| JP | 2021107788 | 7/2021 |

OTHER PUBLICATIONS

"Notice of Reasons for Refusal of Japan Counterpart Application", issued on Jun. 10, 2024, with English translation thereof, p. 1-p. 6.

* cited by examiner

*Primary Examiner* — Helen Zong
(74) *Attorney, Agent, or Firm* — JCIPRNET

(57) ABSTRACT

An information processing apparatus includes a processor configured to acquire a variable print item associated with an element printed by a print instruction, and associated with position information indicating a position of a printable area of the element; receive an inspection accuracy designated by a user for the acquired item; and output the received inspection accuracy and the item and/or the position information associated with the item to an inspection device that inspects the element of a printed matter by the print instruction.

15 Claims, 12 Drawing Sheets

| | 61a | 61b | 61c | 61d | 61e | 61f |
|---|---|---|---|---|---|---|
| 61 | NAME | ADDRESS | TELEPHONE NUMBER | AMOUNT | ADVERTISING IMAGE | CERTIFICATION IMAGE |
| 62 | LOW | LOW | LOW | HIGH | LOW | HIGH |

FIG. 6A
| | 71a | 71b | 71c | 71d | 71e | 71f |
|---|---|---|---|---|---|---|
| | NAME | ADDRESS | TELEPHONE NUMBER | AMOUNT | ADVERTISING IMAGE | CERTIFICATION IMAGE |
| 72a | ◇◇ ◇◇ | ◇◇ PREFECTURE ◇◇ CITY ◇◇ VILLAGE ◇-◇-◇ | ◇◇◇◇◇◇ | 6,980,000 | banner1.tif | person1.tif |
| 72b | ▽▽ ▽▽ | ▽▽ PREFECTURE ▽▽ CITY ▽▽ VILLAGE ▽-▽-▽ | ▽▽▽▽▽▽ | 700,000 | banner1.tif | person2.tif |
| 72c | △△ △△ | △△ PREFECTURE △△ CITY △△ VILLAGE △-△-△ | △△△△△△ | 19,080,000 | banner1.tif | person3.tif |
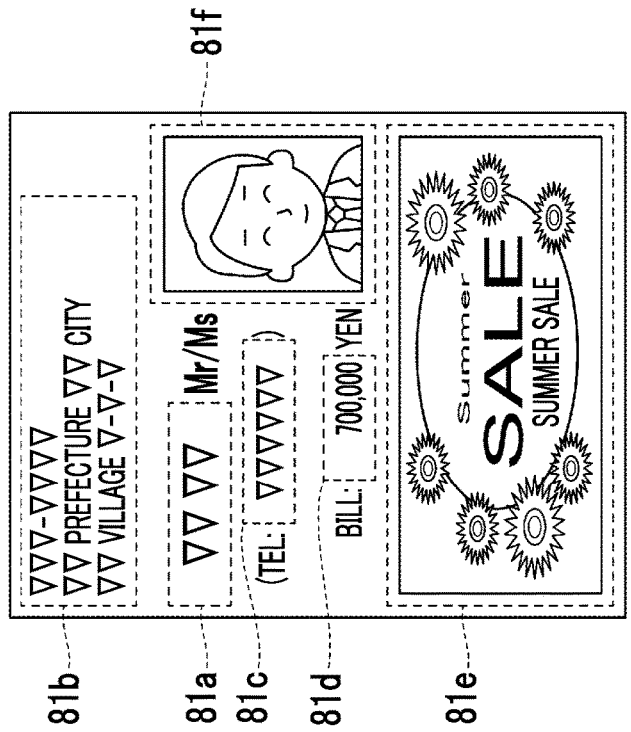
FIG. 6B
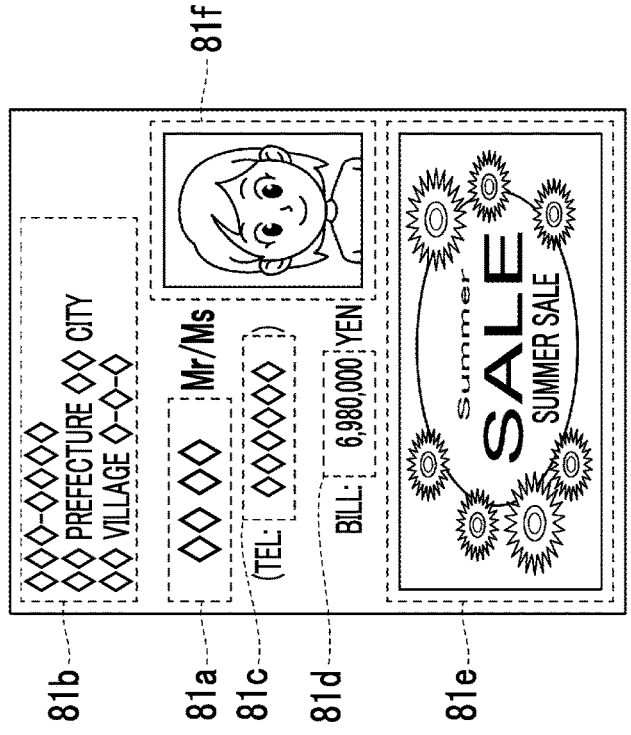
FIG. 6C

FIG. 7

| COLUMN | TYPE | INSPECTION ACCURACY |
|---|---|---|
| NAME | TEXT | LOW |
| ADDRESS | TEXT | LOW |
| TELEPHONE NUMBER | TEXT | LOW |
| AMOUNT | TEXT | LOW/[EQUAL TO OR LESS THAN 10 mm × 10 mm] HIGH |
| ADVERTISING IMAGE | IMAGE | LOW |
| CERTIFICATION IMAGE | IMAGE | LOW/[EQUAL TO OR LARGER THAN 50 mm × 50 mm] HIGH |

INSPECTION ACCURACY SETTING (JOB ○○○○)

☑ SET INSPECTION ACCURACY FOR EACH COLUMN

EDIT

CLOSE

FIG. 9

| COLUMN | INSPECTION ACCURACY | INSPECTION PRESENCE/ABSENCE |
|---|---|---|
| NAME | LOW | O |
| ADDRESS | LOW | O |
| TELEPHONE NUMBER | LOW | x |
| AMOUNT | HIGH | O |
| ADVERTISING IMAGE | LOW | O |
| CERTIFICATION IMAGE | HIGH | O |

INSPECTION ACCURACY SETTING (JOB ○○○○)

☑ SET INSPECTION ACCURACY FOR EACH COLUMN

EDIT

CLOSE

PRINTING SYSTEM, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-170288 filed Oct. 18, 2021.

BACKGROUND

(i) Technical Field

The present invention relates to a printing system, an information processing apparatus, and a non-transitory computer readable medium storing a program.

(ii) Related Art

For example, JP2020-006603A discloses an image inspection system including an image forming unit that forms an image on paper based on image data set with a common area in which an identical image is printed on a plurality of print pages and a variable area in which different variable images are printed on a plurality of print pages, an image reading unit that reads an image on which image forming is performed to generate a read image, an inspection image generation unit that generates an inspection image for performing image inspection based on a generated first read image, and an image inspection unit that inspects a second read image based on a difference between the generated second read image and the inspection image, excluding an area other than an inspection target designated to a user.

SUMMARY

Here, a case is considered where inspection of a printed matter by print data is performed by using scan data of the printed matter and the print data. In a case where an operator performs an operation of setting an area including an image in a printable area as an inspection target area and setting the inspection accuracy for each inspection target area, it is difficult to reduce a workload of the operator in a case where it is necessary to reset the inspection accuracy as an image configuration of a print instruction changes.

Aspects of non-limiting embodiments of the present disclosure relate to a printing system, an information processing apparatus, and a non-transitory computer readable medium storing a program that reduce the workload of the operator as the image configuration of the print instruction changes.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a variable print item associated with an element printed by a print instruction, and associated with position information indicating a position of a printable area of the element; receive an inspection accuracy designated by a user for the acquired item; and output the received inspection accuracy and the item and/or the position information associated with the item to an inspection device that inspects the element of a printed matter by the print instruction.

BRIEF DESCRIPTION OF THE DRAWINGS

Exemplary embodiment(s) of the present invention will be described in detail based on the following figures, wherein:

FIGS. 5A and 5B are diagrams showing a UI screen by an inspection accuracy designation unit of a server device according to a first exemplary embodiment, in which FIG. 5A shows the UI screen and FIG. 5B shows inspection accuracy setting content;

FIGS. 6A to 6C are diagrams showing variable printing, in which FIG. 6A shows an example of variable data in a tabular format and FIGS. 6B and 6C shows print data using the variable data;

FIG. 7 is a diagram showing a UI screen by an inspection accuracy designation unit of a server device according to a second exemplary embodiment;

FIGS. 8A and 8B are diagrams showing an inspection in a case where imposition in the imposition template is changed, in which FIGS. 8A and 8B are diagrams using each data in a first row of variable data;

FIG. 9 is a diagram showing a UI screen by an inspection accuracy designation unit of a server device according to a first modification example;

FIGS. 10A and 10B are diagrams showing processing in a case where imposition areas overlap each other, in which FIG. 10A shows print data using variable data and FIG. 10B shows a positional relationship between the imposition areas in FIG. 10A;

DETAILED DESCRIPTION

Hereinafter, exemplary embodiments of the present invention will be described in detail with reference to the accompanying drawings.

Figure 1:
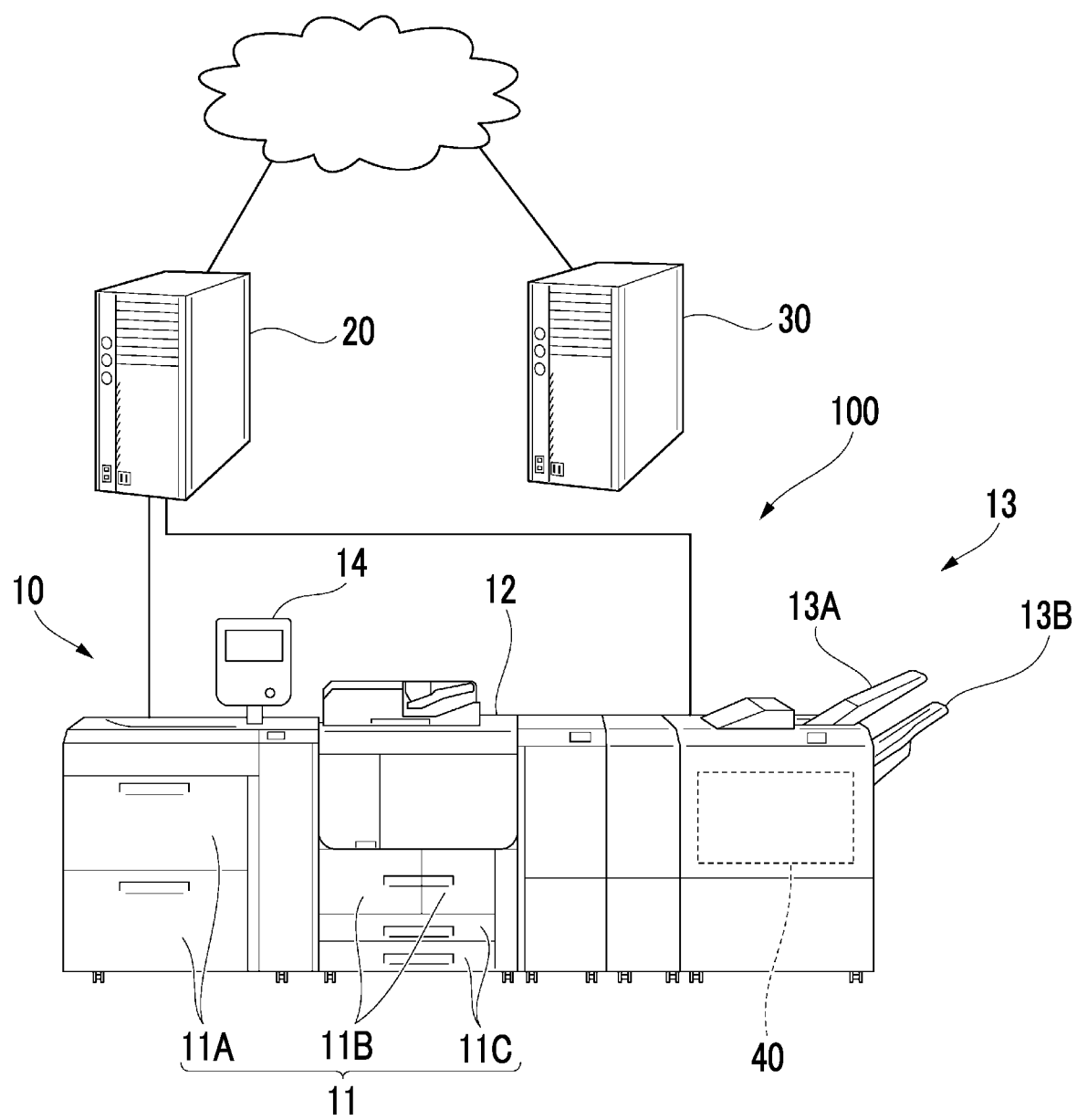
FIG. 1 is a diagram showing a configuration of a printing system.

FIG. 1 is a diagram showing a configuration of a printing system 100.

The printing system 100 shown in FIG. 1 is configured to include a printing device 10 that performs printing on paper. The printing device 10 is connected to server devices 20 and 30 so as to be able to communicate with each other.

As a network connecting the printing device 10 and the server devices 20 and 30, for example, a Local Area Network (LAN) or the Internet is used. However, the network may be a composite type configuration of the LAN and the Internet.

The printing device 10 prints an image on paper based on an acquired print instruction. The print instruction referred to here is an instruction to execute printing, and may include information of an image to be printed or the like.

The printing device 10 is, for example, a so-called production printer used for commercial printing, and has a function capable of executing high-quality and high-speed printing processing. Further, the printing device 10 has a function of verifying a print result on the paper on which the image is printed.

Further, the printing device 10 may have a function capable of executing post-processing according to the print instruction. The post-processing referred to here includes, for example, a process of binding a bundle of paper, a process of folding the paper, a process of cutting the paper, a process of bookbinding, and the like.

The printing device 10 is not limited to the production printer, and may be applied to a general printer (business printer, home printer, or the like).

The printing device 10 includes a paper feed unit 11 that feeds paper to be printed, a printing unit 12 that performs printing on paper from the paper feed unit 11, a discharge device 13 that discharges printed paper, and an operation display unit 14 for a user or an operator.

The paper feed unit 11 is configured to include a plurality of paper feed trays 11A, 11B, and 11C for feeding paper. Each of the paper feed trays 11A to 11C can feed paper of different sizes from each other or the same size.

The printing unit 12 may use an electrophotographic method for transferring toner adhered to a charge-exposed photoconductor to a recording material to fix and form an image, and may use, for example, an inkjet method for ejecting ink onto the recording material to form an image.

The printing unit 12 is configured to be capable of executing two-sided printing in which printing is performed on both sides of the paper.

In the present exemplary embodiment, the discharge device 13 is configured to include discharge trays 13A and 13B to which paper is sorted according to an inspection result.

Further, the discharge device 13 is provided with an inspection device 40 for verifying a print result of paper or a printed matter. The inspection device 40 verifies the print result of the printed matter by contrasting print data with scan data of paper printed using the print data based on information indicating an inspection target area and an inspection accuracy which are acquired from the server device 20. Then, the discharge device 13 discharges the paper from any of the discharge trays 13A and 13B according to a result of the inspection device 40.

The operation display unit 14 is configured to include a display unit that displays various images for operations and various information to be notified to the user, and an input unit disposed with various buttons for input according to an operation image of the display unit. The operation display unit 14 may be configured so that a display screen is configured with, for example, a touch panel and the touch panel has functions of the display unit and the input unit.

The printing device 10 according to the present exemplary embodiment has a function of optically reading an image such as a document and a function of sending documents one by one to a read area, in addition to the function of printing an image on paper. The functions listed for the printing device 10 are merely examples, and do not prevent the printing device 10 from having other functions.

The server devices 20 and 30 may be physically one computer, or may be realized by distributed processing by a plurality of computers. Further, although the server devices 20 and 30 are configured as a shared server that provides a so-called cloud service in the present exemplary embodiment, the server devices 20 and 30 may be on-premises type servers.

In a case where the server device 20 receives a print instruction from, for example, the server device 30, the server device 20 performs rasterization processing after imposition of image data included in the print instruction. A rasterized image, which is an image for which rasterization has been completed, is transmitted to the printing device 10. The server device 20 is an example of an information processing apparatus.

Here, in a digital printing market, a print result verification function is utilized in order to guarantee the quality of the printed matter. The print result verification is performed using inspection accuracy in which an area in a printable area designated as the inspection target area is set to, for example, high, low, and the like.

For example, the inspection accuracy is set to be high for an area, such as the amount of the invoice, in which mistakes are not tolerated, and the inspection accuracy is set to be low for an area, such as the background of a photograph, in which some mistakes are tolerated. That is, the inspection target areas having different inspection accuracy may be designated in a page of the printed matter.

In such a case, in a case where an image configuration of the print instruction is changed, it is necessary to change the inspection target area and the inspection accuracy each time, thereby increasing work man-hour of the operator.

Therefore, in the present exemplary embodiment, a configuration is provided to reduce the workload of the operator as the image configuration of the print instruction changes. This will be described below.

Figure 2:
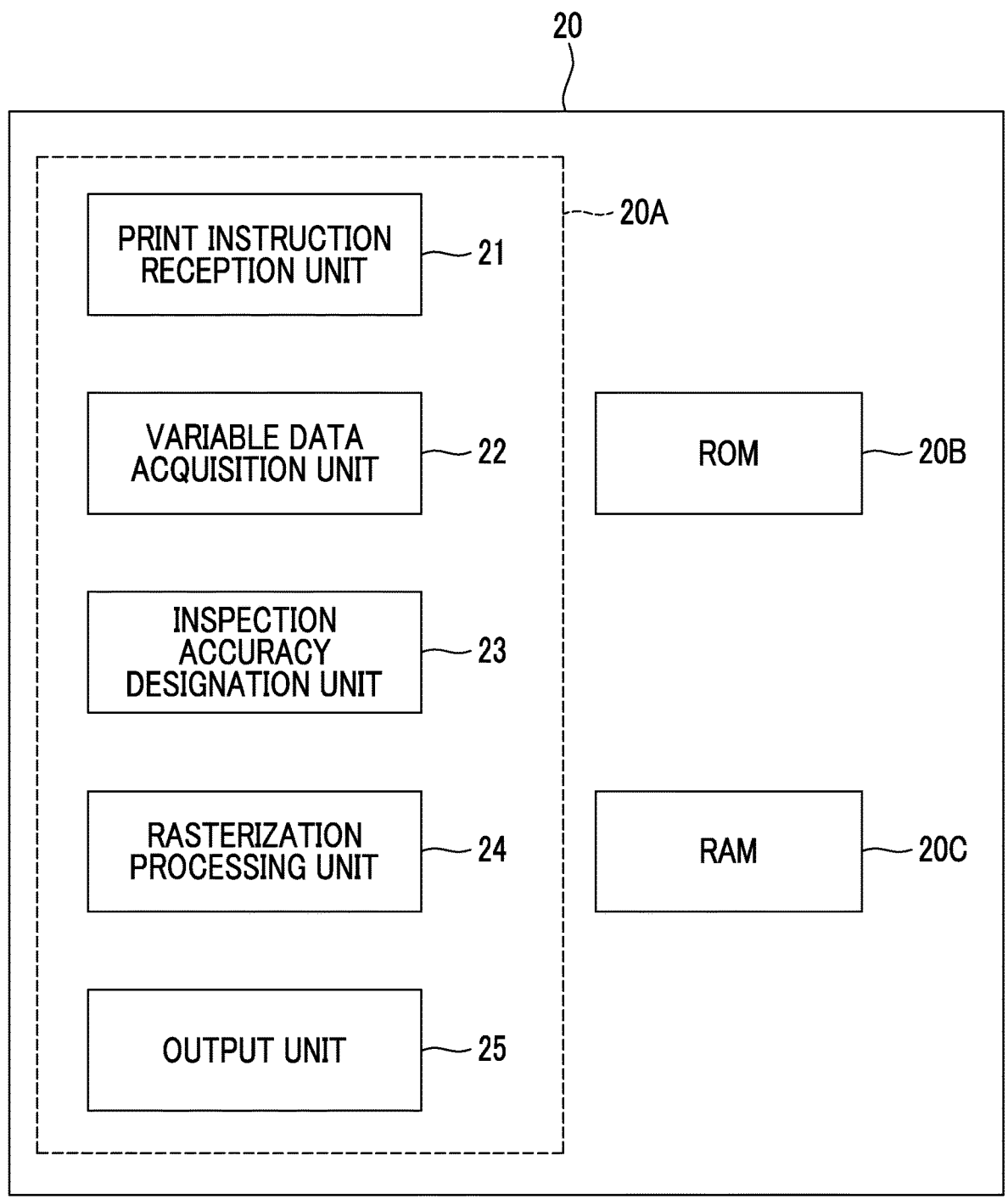
FIG. 2 is a functional block diagram of a server device.

FIG. 2 is a functional block diagram of the server device 20.

As shown in FIG. 2, the server device 20 is configured to include a print instruction reception unit 21, a variable data acquisition unit 22, an inspection accuracy designation unit 23, a rasterization processing unit 24, and an output unit 25.

The print instruction reception unit 21 receives the print instruction transmitted from the user and manages the received print instruction. The print instruction includes information on the image to be printed. In addition to the case where the information of the image includes the image data, the information of the image may include information indicating the image, for example, an image file name or the like.

Variable printing refers to printing in which different image is printed for each page, and refers to, for example, address printing in which the layout or imposition is the same. The variable printing is also called variable printing. In addition, the variable printing is performed using each data included in variable data.

The variable data is, for example, a database using Comma-Separated Values (CSV) files arranged to be separated by commas. In a case where the variable data is displayed in a tabular format, a plurality of columns are arranged in one direction, and a plurality of data are arranged in the other direction for each of the plurality of columns. Each of the plurality of data may be referred to as "each data in the column".

Each data in the column is different from each other, but may be identical. Each data in the column may be a file name as well as text data or numerical data.

In a case where the print instruction received by the print instruction reception unit 21 is to perform the variable printing, the print instruction includes information indicating the variable data and a column of the variable data, or includes position information in the printable area associated with the column. As a result, the position information in the printable area is associated with each data in the column.

The position information in the printable area is information indicating a position imposed on the imposition template which will be described later, and the position is automatically set for an imposed area.

The variable data acquisition unit 22 acquires the variable data from information of the variable data included in the print instruction received by the print instruction reception unit 21. The variable data acquisition unit 22 confirms that information indicating the column included in the print instruction matches the column of the variable data acquired by the variable data acquisition unit 22.

Further, the variable data acquisition unit 22 acquires image data to be printed from each data in the column. The acquired image data is transmitted to the rasterization processing unit 24.

The variable data may be acquired by the server device 20 from another device, or may be input and operated by the server device 20. Further, in addition to a case where the variable data is acquired each time, the variable data may be selected from data held in advance.

Here, the column of the variable data is an example of a variable print item.

In a case where the data in the column is the text data or the numerical data, the data in the column is an example of an element. Further, the image data acquired from the data in the column in a case where the data in the column is a file name is an example of the element.

The inspection accuracy designation unit 23 has a function of designating the inspection accuracy for each column of variable data by a user, for example, on a User Interface (UI) screen.

The inspection accuracy referred to here refers to an accuracy in a case where the inspection target area is inspected. The inspection accuracy is designated by the user for the column of the print instruction, and different accuracy can be set for each column or each column can be set to the same accuracy.

In the present exemplary embodiment, a configuration in which the server device 20 includes the inspection accuracy designation unit 23 is adopted, but the present exemplary embodiment is not limited thereto. A configuration in which the printing device 10 or another server device 30 includes the inspection accuracy designation unit 23 may be adopted.

The rasterization processing unit 24 performs rasterization processing after imposition using the position information included in the print instruction received by the print instruction reception unit 21 and each data of the variable data acquired by the variable data acquisition unit 22, and generates the print data which is the rasterized image. As will be described later, the print data is transmitted to the printing device 10 and the inspection device 40 by the output unit 25.

In addition, the rasterization processing unit 24 acquires the inspection target area and the inspection accuracy as information necessary for inspection, and generates inspection instruction information. That is, the rasterization processing unit 24 generates the inspection instruction information by associating the inspection accuracy with the inspection target area. The inspection instruction information is transmitted to the inspection device 40 by the output unit 25 as will be described later.

The inspection target area refers to an area for inspecting a scanned image of the printed matter printed by the print data, and a range of an image to be inspected is specified using the position information included in the print instruction received by the print instruction reception unit 21. The position information of the print instruction is information indicating a position imposed on the imposition template, which will be described later, for each column.

Further, the inspection accuracy is designated by the user for each column of the variable data by the inspection accuracy designation unit 23.

Although the case where the inspection instruction information is generated according to the inspection target area and the inspection accuracy has been described, the present exemplary embodiment is not limited thereto, and the inspection instruction information may further include information indicating the column. Further, in a case where the inspection device 40 can acquire the variable data, inspection execution information may be generated based on the information indicating the column and the inspection accuracy for the column. The inspection instruction information includes at least inspection accuracy.

The output unit 25 outputs the print data generated by the rasterization processing unit 24 to the printing device 10, and also outputs the inspection instruction information generated by the rasterization processing unit 24 to the inspection device 40.

Figure 3:
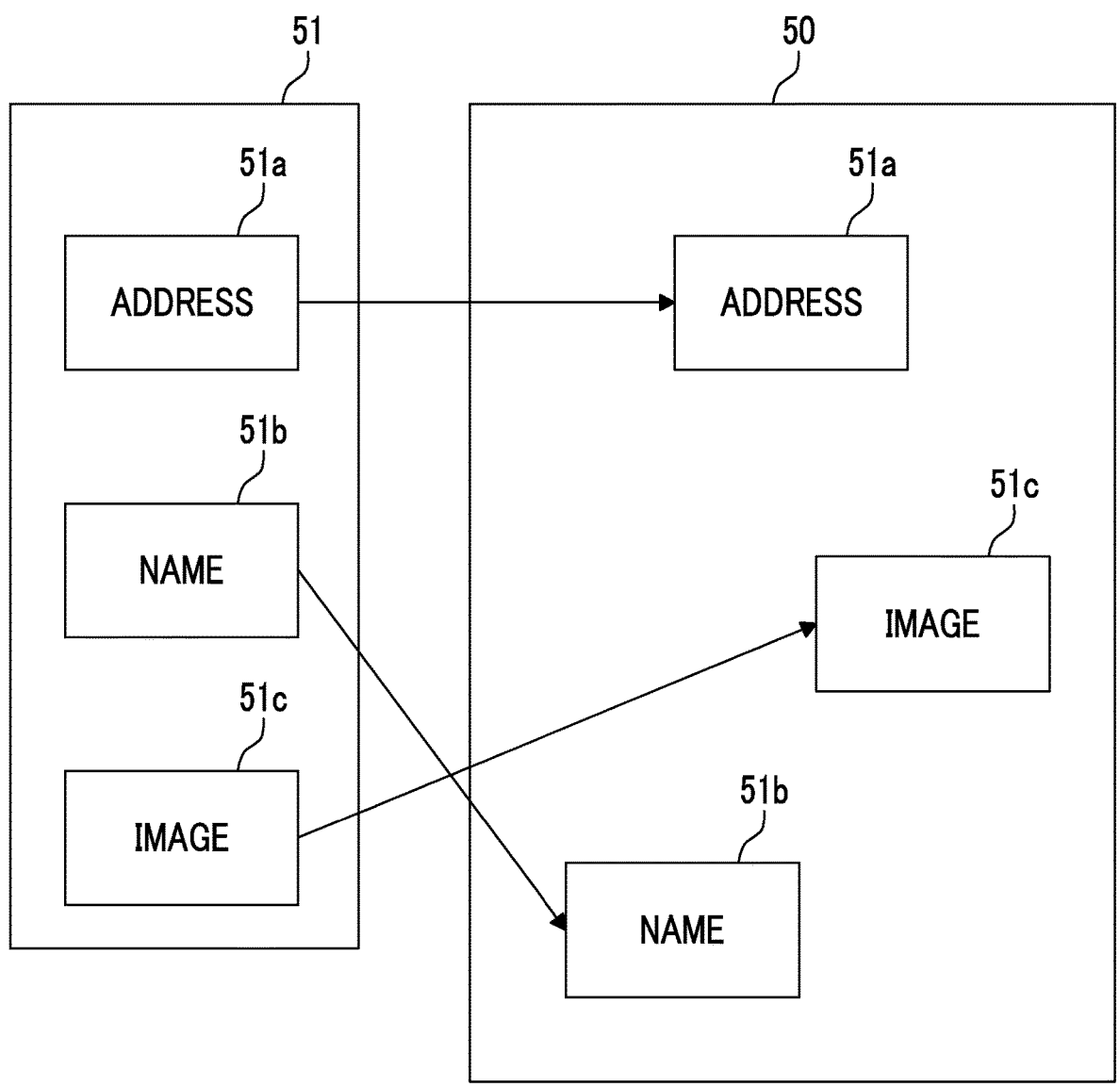
FIG. 3 is a diagram showing imposition of columns with respect to an imposition template.

FIG. 3 is a diagram showing imposition of columns with respect to the imposition template 50.

As shown in FIG. 3, respective columns 51*a*, 51*b*, and 51*c* of the variable data are displayed in a column group 51. In an example shown in FIG. 3, the column 51*a* is an "address", the column 51*b* is a "name", and the column 51*c* is an "image".

The columns 51*a*, 51*b*, and 51*c* of the column group 51 are dragged to be positioned on the imposition template 50, respectively. By such positioning, the position information for each of the columns 51*a*, 51*b*, and 51*c* is automatically set. Therefore, the position where each data of the columns 51*a*, 51*b*, and 51*c* is printed is determined. An imposition operation is executed by the user, for example, on a display connected to the server device 30.

The positions of the columns 51*a*, 51*b*, and 51*c* in the imposition template 50 can be changed, and the position information is updated to the changed positions of the columns.

As described above, in the present exemplary embodiment, the inspection target area and the inspection accuracy are associated with each other via the column of the variable data. Therefore, in a case of changing the position imposed on the imposition template in association with the column according to the print instruction, the position information in the inspection target area or the printable area is changed according to the change in the imposed position with respect to the imposition template, and the inspection accuracy associated with the column is held.

Further, in a case of changing the inspection accuracy according to the print instruction, the inspection accuracy associated with the column is changed by designating the inspection accuracy for each column again by the inspection accuracy designation unit 23.

Then, even in a case where the inspection that reflects the changes is performed by newly acquiring the inspection target area and inspection accuracy by the rasterization processing unit 24 and the image configuration of the print instruction is changed, the increase in the workload of the operator is suppressed.

Here, each function of the server device 20 is realized by a CPU 20A as an example of a processor. The CPU 20A scans a program stored in a Read Only Memory (ROM)

20B, and executes the program using a Random Access Memory (RAM) 20C as a work area. Here, the program executed by the CPU 20A may be provided to the server device 20 in a state of being stored in a computer-readable recording medium such as a magnetic recording medium (such as a magnetic tape or a magnetic disk), an optical recording medium (such as an optical disk), a magneto-optical recording medium, or a semiconductor memory. Further, the program executed by the CPU 20A may be downloaded to the server device 20 by using communication means such as the Internet.

Further, in the present exemplary embodiment, each function of the server device 20 is realized by software, but the present invention is not limited thereto, and may be realized by, for example, an Application Specific IC (ASIC).

Figure 4:
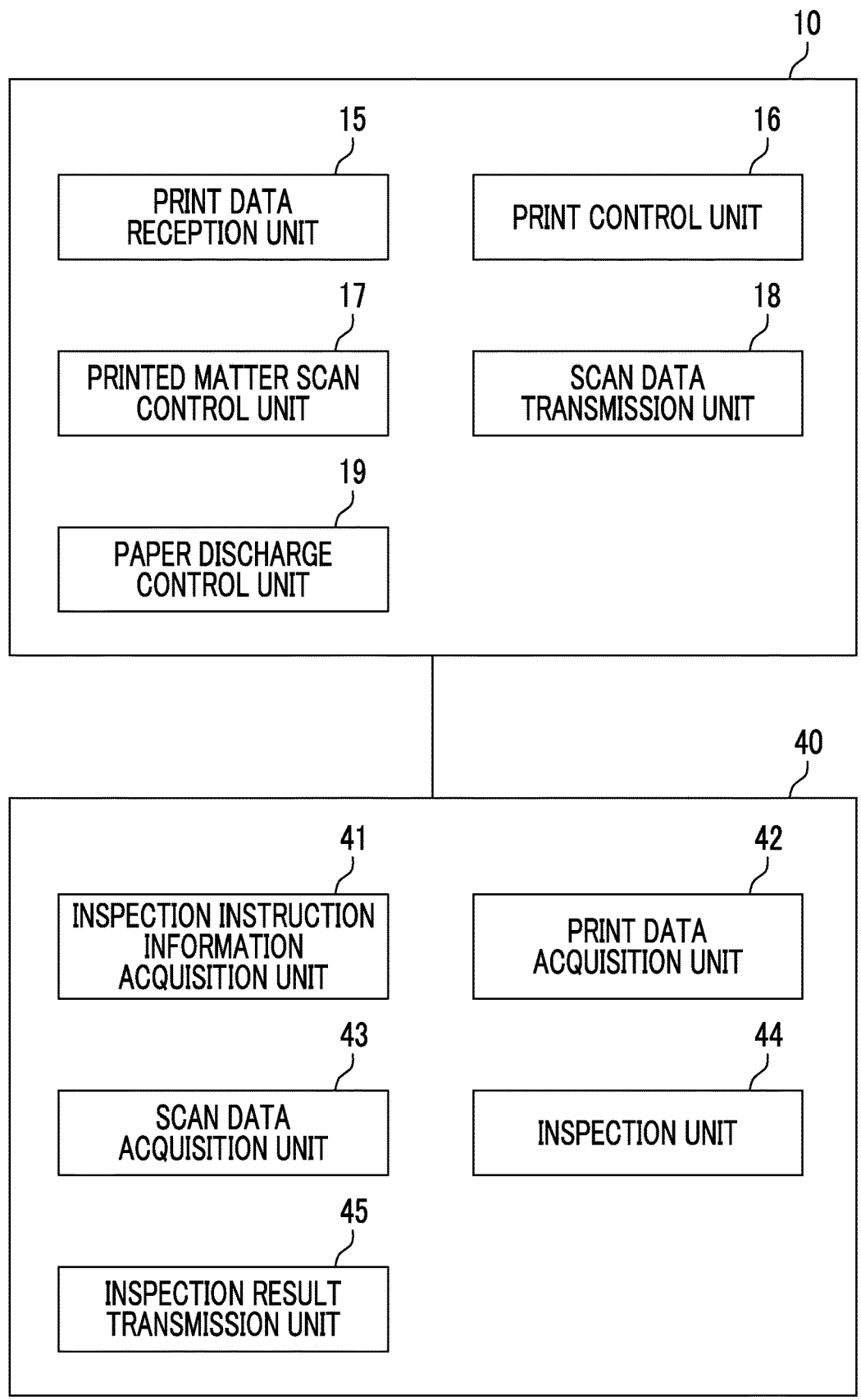
FIG. 4 is a functional block diagram showing a printing device.

FIG. 4 is a functional block diagram of the printing device 10.

As shown in FIG. 4, the printing device 10 includes a print data reception unit 15, a print control unit 16, a printed matter scan control unit 17, a scan data transmission unit 18, and a paper discharge control unit 19.

Further, the inspection device 40 provided in the discharge device 13 (see FIG. 1) of the printing device 10 inspects an object such as a text or an image of a printed matter according to a print instruction. The inspection device 40 is configured to include an inspection instruction information acquisition unit 41, a print data acquisition unit 42, a scan data acquisition unit 43, an inspection unit 44, and an inspection result transmission unit 45.

The print data reception unit 15 receives the print data generated by the rasterization processing unit 24 (see FIG. 4) of the server device 20, and the print control unit 16 controls the printing unit 12 performed by the received print data.

Then, the printed matter scan control unit 17 controls a scan function for optically reading an image of the printed matter while the printed matter printed by the printing unit 12 is being transported to the inspection device 40. The scan data transmission unit 18 transmits the scan data acquired by the scan function to the inspection device 40.

The paper discharge control unit 19 sorts and discharges the printed matter to either the discharge tray 13A or the discharge tray 13B according to a result of the inspection by the inspection device 40. Specifically, the paper discharge control unit 19 discharges the printed matter that has passed the inspection by the inspection device 40 from the discharge tray 13A, and discharges the printed matter that has not passed the inspection by the inspection device 40 from the discharge tray 13B.

The result of the inspection by the inspection device 40 may be displayed on the operation display unit 14 (see FIG. 1).

In the inspection device 40, the inspection instruction information acquisition unit 41 acquires the inspection instruction information output from the output unit 25 of the server device 20. The inspection instruction information is generated by the rasterization processing unit 24, and includes the inspection target area and the inspection accuracy.

The print data acquisition unit 42 acquires the print data output from the output unit 25 of the server device 20. The print data is a rasterized image generated by the rasterization processing unit 24.

Further, the scan data acquisition unit 43 acquires the scan data transmitted from the scan data transmission unit 18 of the printing device 10. The scan data is data obtained by scanning the printed matter printed based on the print data.

The inspection unit 44 inspects the scan data using the acquired inspection target area, the inspection accuracy, and the print data. That is, the inspection unit 44 compares the area specified in the inspection target area in the scan data with the print data, and determines a result of the comparison using the inspection accuracy.

This comparison is performed by collating the scan data area specified in the inspection target area with the print data area corresponding to the scan data area in dot units of a size determined from the inspection accuracy.

For example, in a case where all dots match, the printed matter is determined to pass the inspection. On the other hand, in a case where dots that do not match exist, the printed matter is determined to not pass the inspection. In the determination, the inspection may be passed in a case where the number of non-matching dots is less than the predetermined number (for example, 2), and the inspection may be not passed in a case where the number is equal to or more than the predetermined number.

The inspection result transmission unit 45 transmits either information on passing or non-passing the inspection to the printing device 10 as information indicating the inspection result by the inspection unit 44. As described above, the paper discharge control unit 19 of the printing device 10 sorts and discharges the inspected printed matter to either the discharge tray 13A or the discharge tray 13B.

Further, the inspection result transmission unit 45 transmits information for specifying the inspected printed matter, for example, information indicating which sheet of which print instruction to the printing device 10, thereby enabling the inspection result to be displayed on the operation display unit 14 (see FIG. 1). Further, the inspection result transmission unit 45 may notify the user at a position away from the printing device 10 of the print result by transmitting the print result to the server device 30 (see FIG. 1).

In the configuration of the printing system 100 according to the present exemplary embodiment, the server device 20 is connected to an upstream side of the printing device 10, but the present exemplary embodiment is not limited thereto, and the printing device 10 may be configured to include each function of the server device 20 (see FIG. 2).

First Exemplary Embodiment

Next, a first exemplary embodiment will be described.

Figures 5A, 5B:
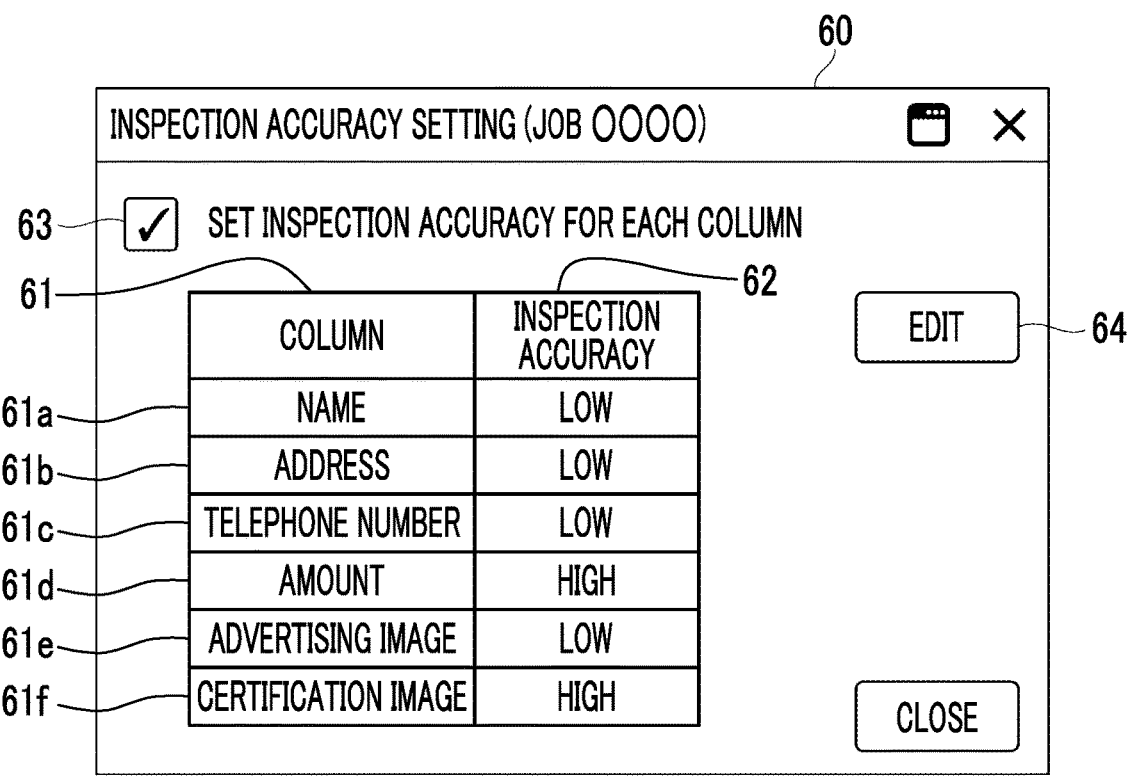

FIGS. 5A and 5B are diagrams showing an UI screen 60 by the inspection accuracy designation unit 23 (see FIG. 2) of the server device 20 according to the first exemplary embodiment, in which FIG. 5A is the UI screen 60 and FIG. 5B shows inspection accuracy setting content.

The UI screen 60 shown in FIG. 5A is a setting screen for performing inspection accuracy setting for the print instruction "Job 0000", and is displayed in a tabular format including a column 61 and an inspection accuracy 62.

On the left side of the tabular format, as the column 61, in order from the top, a first column 61a of "name", a second column 61b of "address", a third column 61c of "telephone number", a fourth column 61d of "amount", a fifth column 61e of "advertising image", and a sixth column 61f of "certification image" are displayed. The first column 61a and the like are automatically extracted from the imposition template (see FIG. 3) and do not require input by the user.

The inspection accuracy 62 on the right side is selected by the user using, for example, a pull-down menu in which either "low", "medium" or "high" can be selected. The inspection target area in which "low" is selected is inspected, for example, at 300 dpi, a case of "medium" is inspected, for example, at 600 dpi, and a case of "high" is inspected, for example, at 1200 dpi.

In the first exemplary embodiment, "low" is selected for the first column 61a to the third column 61c and the fifth column 61e, and "high" is selected for the fourth column 61d and the sixth column 61f.

To explain further, the inspection accuracy is improved for parts where the printed matter should not have any mistakes or stains as in the "amount" of the fourth column 61d and the "certification image" of the sixth column 61f. Further, the inspection accuracy is low for a part where some stains are tolerated as in the "name" of the first column 61a and a part where some mistakes are tolerated as in the "advertising image" of the fifth column 61e even in a case of the image.

The UI screen 60 includes a check box 63 to "set inspection accuracy for each column". In a case where the check box 63 is checked, the inspection accuracy can be set for each column 61 such as "name" as shown in FIG. 5A.

Further, in a case where the check box 63 is not checked, the inspection accuracy cannot be set for each column 61 such as "name", and one inspection accuracy is set for all columns 61.

In this way, the check box 63 enables a unit for designating the inspection accuracy to be set. In a case where the check box 63 is not checked, the unit for designating the inspection accuracy is set for all columns 61. On the other hand, in a case where the check box 63 is checked, the unit for designating the inspection accuracy is set for each of all columns 61.

Further, the UI screen 60 is provided with an edit button 64 that enables a setting for changing the inspection accuracy, and the user can change the content of the inspection accuracy that has already been set by using the edit button 64.

In that case, since the inspection accuracy is set for the column 61, the inspection target area is not changed even in a case where the inspection accuracy is changed. Therefore, only the setting of the inspection accuracy can be changed without changing the inspection target area.

As described above, the inspection target area is changed via the imposition template (see FIG. 3).

In a case where the setting content on the UI screen 60 is confirmed, the inspection accuracy designation unit 23 creates the table shown in FIG. 5B and transmits the table to the rasterization processing unit 24.

FIGS. 6A to 6C are diagrams showing the variable printing, in which FIG. 6A shows an example of variable data 70 in a tabular format, and FIGS. 6B and 6C show print data using the variable data 70.

In the variable data 70 shown in FIG. 6A, a column 71 is displayed in the row of a table, and each data in the column 71 is displayed in the column of the table.

More specifically, as the column 71, a first column 71a of "name", a second column 71b of "address", a third column 71c of "telephone number", a fourth column 71d of "amount", a fifth column 71e of "advertising image", and a sixth column 71f of "certification image" are displayed. The first column 71a to the sixth column 71f correspond to the first column 61a to the sixth column 61f in FIG. 5A.

Corresponding data are arranged in a column direction (vertical direction) in each of the first column 71a to the sixth column 71f in FIG. 6A. In a case where each data of a first row 72a is used, the printed matter shown in FIG. 6B is formed by imposition using the imposition template 50 (see FIG. 3). Further, in a case where each data of a second row 72b is used, the printed matter shown in FIG. 6C is formed by imposition using the imposition template (see FIG. 3).

That is, in the printable area, each data of the first column 71a is arranged in an imposition area 81a shown in FIGS. 6B and 6C. Similarly, data of the second column 71b to the sixth column 71f are arranged in the imposition areas 81b to 81f, respectively.

Therefore, each data in the first row 72a is used in FIG. 6B, and each data in the second row 72b is used in FIG. 6C.

The information indicating the position in the printable area by the imposition areas 81a to 81f is an example of the position information, and is associated with the first column 71a to the sixth column 71f of the variable printing.

In the variable data 70 shown in FIG. 6A, a column corresponding to a postal code in FIGS. 6B and 6C is omitted. Information on the postal code is configured to be acquired from an address based on a postal code database.

In a case of the inspection in the inspection device 40, the imposition areas 81a to 81f of FIGS. 6B and 6C can be set as the inspection target areas. In this way, the inspection target area and the inspection accuracy are associated with each other via the columns 61a to 61f and 71a to 71f. The inspection target area and the inspection accuracy are not directly associated with each other.

More specifically, the inspection accuracy for the imposition area 81a in FIGS. 6B and 6C is set to "low". Further, the inspection accuracy for the imposition areas 81b to 81c and 81e is also set to "low". On the other hand, the inspection accuracy for the imposition areas 81d and 81f is set to "high".

Second Exemplary Embodiment

Next, a second exemplary embodiment will be described.

FIG. 7 is a diagram showing the UI screen 60 by the inspection accuracy designation unit 23 (see FIG. 2) of the server device 20 according to the second exemplary embodiment. FIG. 7 corresponds to FIG. 5A of the first exemplary embodiment, and repeated description may be omitted.

The UI screen 60 shown in FIG. 7 is displayed in a tabular format including a type 65 in addition to the column 61 and the inspection accuracy 62. That is, the UI screen 60 shown in FIG. 7 includes the type 65 that is not included in the case of the first exemplary embodiment. As the column 61, the first column 61a to the sixth column 61f are displayed.

Further, the UI screen 60 shown in FIG. 7 includes the check box 63 and the edit button 64.

In the case of the second exemplary embodiment, different text and image are displayed in the type 65. In a case of the text, data of the variable data (see FIG. 6A) is used without change, and in a case of the image, an image specified from the data of the variable data (see FIG. 6A) is acquired and used.

The inspection accuracy 62 shown in FIG. 7 can be selected from "low", "medium", and "high", and can also be selected in a case where a condition setting is performed. In the fourth column 61d of "amount" and the sixth column 61f of "certification image", the condition setting is selected.

Specifically, although the fourth column 61d is set to "low", the fourth column 61d is set to "high" in a case where the size is equal to or less than 10 mm×10 mm. Therefore, the inspection target area on which the "amount" of the fourth column 61d is printed is inspected as either "low" or "high" depending on the size of the text.

In a case of a small text having a size which is equal to or less than 10 mm×10 mm, it is assumed that the amount is difficult to be read due to stains or the like, so that the inspection accuracy is improved. On the other hand, in a case where a text which is printed relatively large, such an inconvenience situation is unlikely to occur, so the inspection accuracy is not improved.

Further, although the sixth column 61f is set to "low", the sixth column 61f is set to "high" in a case where the size is equal to or larger than 50 mm×50 mm. Therefore, the inspection target area on which the "certification image" of the sixth column 61f is printed is inspected as either "low" or "high" depending on the size of the image.

In a case of a large image having a size which is equal to or larger than 50 mm×50 mm, it is assumed that stains or the like are noticeable, so that the inspection accuracy is improved. On the other hand, in a case of a relatively small image, stains or the like is unlikely noticeable, so the inspection accuracy is not improved.

Figure 8A:
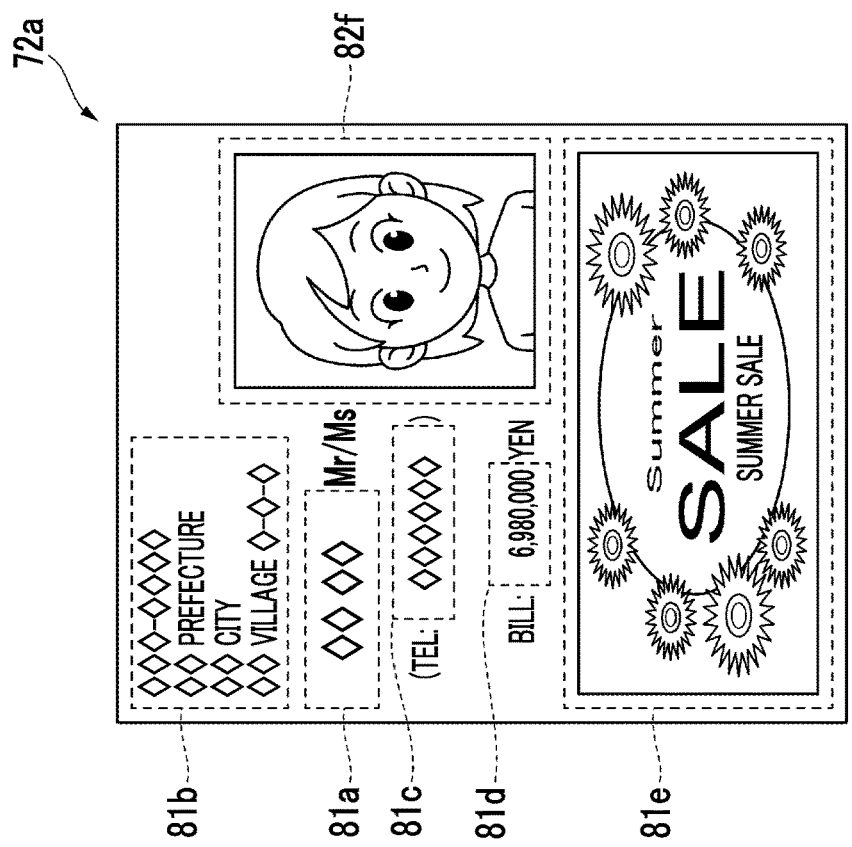
Figure 8B:
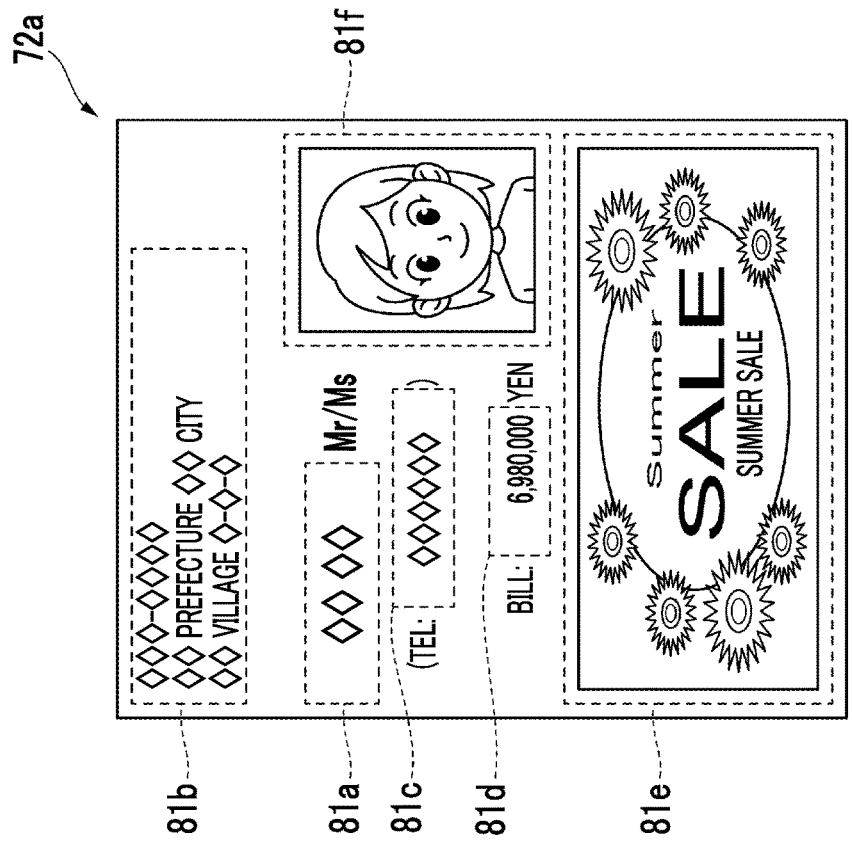

FIGS. 8A and 8B are diagrams showing the inspection in a case where the imposition in the imposition template is changed, and FIGS. 8A and 8B use each data in the first row 72a of the variable data 70, and set with the inspection accuracy shown in FIG. 7.

The imposition areas 81a to 81f shown in FIG. 8A and the imposition areas 82a to 82f shown in FIG. 8B correspond to each other, and the imposition shown in FIG. 8A is changed to the imposition shown in FIG. 8B. Specifically, the imposition areas 81b, 81c, 81d, and 81f shown in FIG. 8A and the imposition areas 82b, 82c, 82d, and 82f shown in FIG. 8B have sizes different from each other. On the other hand, the other imposition areas 81a and 81e shown in FIG. 8A and the imposition areas 82a and 82e shown in FIG. 8B have the same size.

Here, as described above, the imposition area 81d is an area in which each data (see FIG. 6A) of the fourth column 71d of the variable data 70 is displayed, and the imposition area 81f is an area in which each data of the sixth column 71f (see FIG. 6A) is displayed.

According to the inspection accuracy setting (see FIG. 7), the fourth column 61d of the "amount" (corresponding to the fourth column 71d of FIG. 6A) has the inspection accuracy "low" in a case where the size exceeds 10 mm×10 mm, and has the inspection accuracy "high" in a case where the size is equal to or less than 10 mm×10 mm. Further, the inspection accuracy of the sixth column 61f of the "certification image" (corresponding to the sixth column 71f of FIG. 6A) has the inspection accuracy "low" in a case where the size is less than 50 mm×50 mm, and has an inspection accuracy "high" in a case where the size is equal to or larger than 50 mm×50 mm.

In the imposition shown in FIG. 8A, a size of the imposition area 81d exceeds 10 mm×10 mm, so that the inspection accuracy of the imposition area 81d is "low". Further, a size of the imposition area 81f is less than 50 mm× 50 mm, so that the inspection accuracy of the imposition area 81f is also "low".

On the other hand, in the imposition shown in FIG. 8B, a size of the imposition area 82d is equal to or less than 10 mm×10 mm, so that the inspection accuracy of the imposition area 82d is "high". Further, a size of the imposition area 82f is equal to or larger than 50 mm×50 mm, so that the inspection accuracy of the imposition area 82f is also "high".

As described above, in the second exemplary embodiment, the inspection accuracy condition setting is performed, and the imposition to the imposition template is changed, so that the inspection accuracy is changed according to the changed imposition to the imposition template. Further, by automatically changing the inspection accuracy, the burden on the inspection device 40 can be reduced and the inspection time is shortened.

In the second exemplary embodiment, the condition setting is performed by the vertical and horizontal sizes of the imposition areas 81a to 81f, but the condition setting is not limited thereto.

For example, the condition setting may be performed by the height of the imposition areas 81a to 81f. For example, condition setting is conceivable that increases the inspection accuracy in a case where the height of the text or the image is equal to or larger than a predetermined threshold value, and lowers the inspection accuracy in a case where the height is less than the threshold value. Further, the opposite, that is, condition setting is conceivable that lowers the inspection accuracy in a case where the height is equal to or larger than the threshold value and increases the inspection accuracy in a case where the height is less than the threshold value.

To explain further, in the case of the text, the condition may be set according to the height of the text, or the condition may be set according to a type of the text such as KATAKANA (Japanese characters), Chinese characters, or alphabets, or according to language notation such as Japanese or English. Further, in the case of the image, the condition setting may be performed by the number of pixels per unit area.

More specifically, it is conceivable to increase the inspection accuracy in a case where the height of the text is equal to or larger than the predetermined threshold value, and to lower the inspection accuracy in a case where the height of the text is less than the threshold value. On the contrary, it is conceivable to lower the inspection accuracy in a case where the height of the text is equal to or larger than the threshold value and to increase the inspection accuracy in a case where the height of the text is less than the threshold value.

Further, in a case where the text is only KATAKANA (Japanese characters) or Chinese characters, the inspection accuracy may be increased, and, in a case of another text such as the alphabets, the inspection accuracy may be lowered, and the opposite is conceivable. In addition, the same inspection accuracy condition setting is considered in a case where the text include or does not include KATAKANA (Japanese characters) or Chinese characters.

Furthermore, condition setting is conceivable that increases the inspection accuracy in a case where the text is the native language of a relevant country and lowers the inspection accuracy in other cases.

In the case of the image, the inspection accuracy is increased in a case where the number of pixels per unit area is equal to or larger than a predetermined threshold value, the inspection accuracy is lowered in a case where the number of pixels is less than the threshold value, and the opposite inspection accuracy condition setting is conceivable. For example, the filled part has low inspection accuracy, and the unfilled part has high inspection accuracy.

Furthermore, in a case where there is an area where the text and the image overlap each other, the inspection accuracy is lowered in a case where the overlapping area is transparently printed, the inspection accuracy is increased in a case where the overlapping area is not transparently printed, and the opposite inspection accuracy condition setting is conceivable.

The above-described condition setting is an example of a predetermined condition.

Various Modification Examples

Next, modification examples of the first exemplary embodiment and the second exemplary embodiment described above will be described.

FIG. 9 is a diagram showing a UI screen 60 by the inspection accuracy designation unit 23 (see FIG. 2) of the server device 20 according to a first modification example.

The UI screen 60 shown in FIG. 9 is displayed with an inspection presence/absence column 66 unlike the first exemplary embodiment and the second exemplary embodiment.

In the inspection presence/absence column 66, whether or not to inspect can be set for each of the first column 61a to the sixth column 61f regardless of whether or not the inspection accuracy is designated. In an example shown in FIG. 9, in the first column 61a to the sixth column 61f, the third column 61c of "telephone number" is "x", and the others are "0". Therefore, the imposition area 81c (see, for example, FIG. 6B or 6C) of the third column 61c is not the inspection target area, thereby being not inspected. Whether or not to inspect is set for each of the first column 61a to the sixth column 61f. As a result, the number of inspection target areas is reduced, the burden on the inspection device 40 is reduced and the inspection time is shortened.

The inspection presence/absence column 66 shown in FIG. 9 can be set for each print instruction.

Further, another modification example will be described.

Figure 10B:
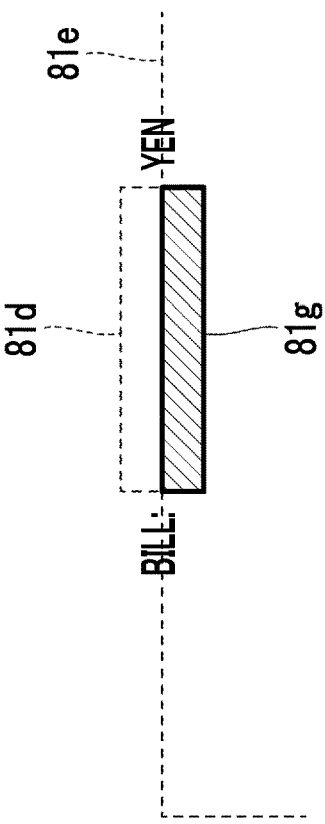
Figure 10A:
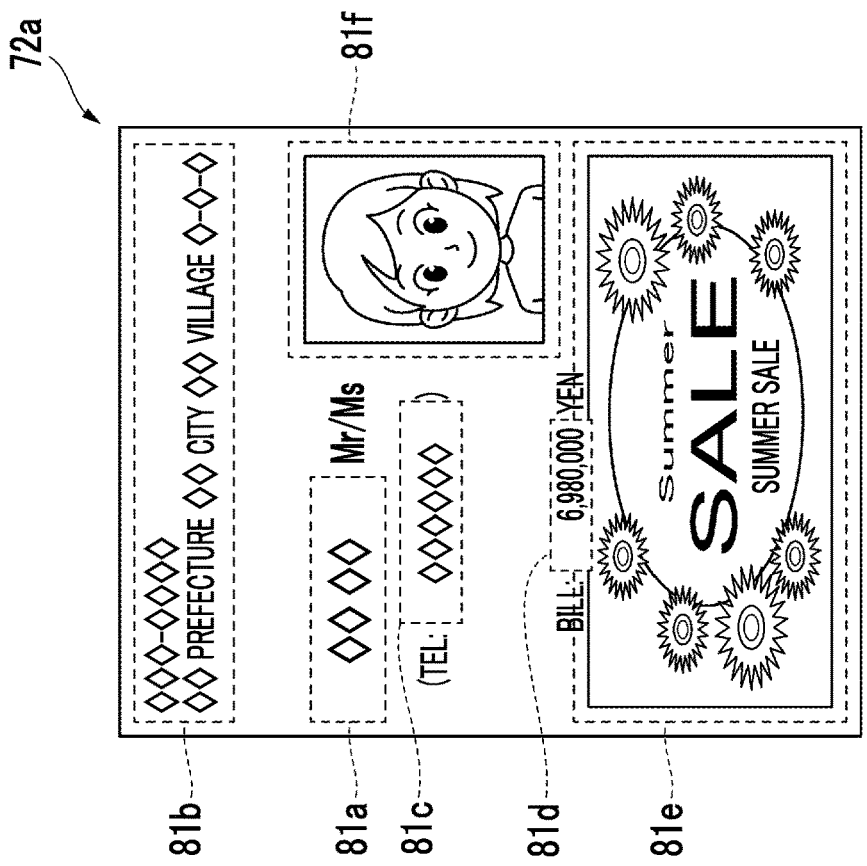

FIGS. 10A and 10B are diagrams showing processing in a case where the imposition areas 81d and 81e overlap each other, in which FIG. 10A shows the print data using the variable data 70 (see FIG. 6A), and FIG. 10B shows a positional relationship between the imposition areas 81d and 81e in FIG. 10A.

A printed matter shown in FIG. 10A has an overlapping area 81g, which is an area where the imposition area 81d and the imposition area 81e overlap each other. In a case where the inspection accuracy of the imposition area 81d and the inspection accuracy of the imposition area 81e are different from each other, the inspection accuracy of the overlapping area 81g is set to either one.

The overlapping area 81g is an example of an overlapping area.

Here, in a case where the imposition area 81d and the imposition area 81e overlap each other, in addition to the transparent printing in which the text in the imposition area 81d and the image in the imposition area 81e are transparently printed, undercoat printing, in which printing is performed so that the text in the imposition area 81d is displayed instead of the image in the imposition area 81e, is performed in the overlapping area 81g.

Therefore, it is conceivable to set the inspection accuracy of the overlapping area 81g to a lower inspection accuracy in the case of the transparent printing, and it is conceivable to set the inspection accuracy to the higher inspection accuracy in the case of the undercoat printing.

For example, referring to the inspection accuracy setting (FIG. 5A) in the case of the first exemplary embodiment, the fourth column 61d "amount" corresponding to the imposition area 81d has the inspection accuracy "high", and the fifth column 61e "advertising image" corresponding to the imposition area 81e has the inspection accuracy "low". Therefore, the inspection accuracy of the overlapping area 81g is set to "low" in a case of the transparent printing, and the inspection accuracy of the overlapping area 81g is set to "high" in a case of the undercoat printing.

Figure 11:
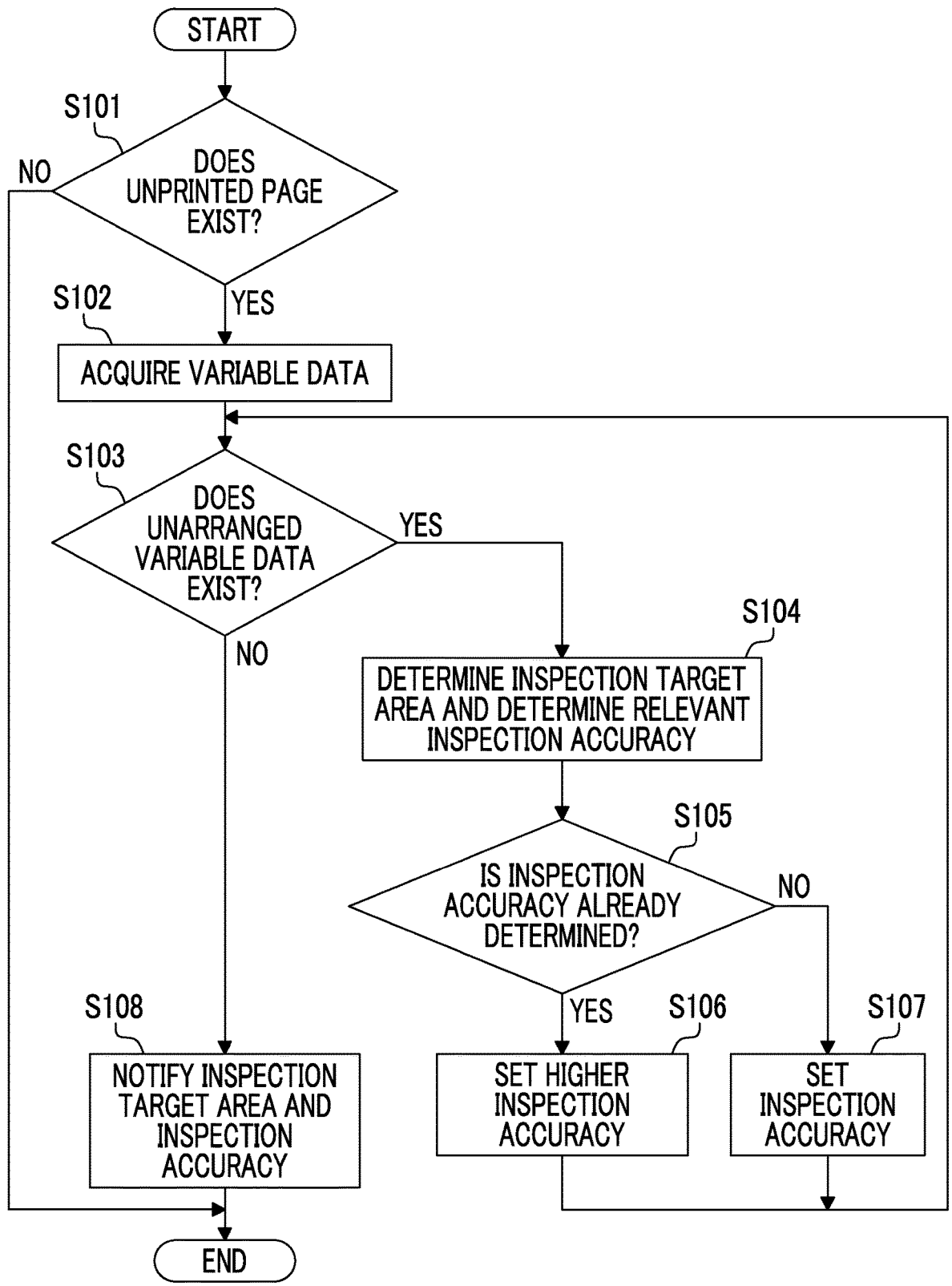
FIG. 11 is a flowchart showing a processing example of a server device according to a modification example.

FIG. 11 is a flowchart showing a processing example of the server device 20 according to the modification example.

In the processing example shown in FIG. 11, the print instruction reception unit 21 (see FIG. 2) determines whether or not an unprinted page exists (step S101). In a case where the unprinted page exists (YES in step S101), corresponding variable data is acquired by the variable data acquisition unit 22 (see FIG. 2) (step S102), and each data is imposed by the rasterization processing unit 24 (see FIG. 2) based on the acquired variable data.

After that, the print instruction reception unit 21 determines whether or not the unarranged variable data exists (step S103). In a case where the unarranged variable data exists (YES in step S103), the rasterization processing unit 24 determines the inspection target area, and determines the corresponding inspection accuracy based on the designation result of the inspection accuracy designation unit 23 (see FIG. 2) (step S104).

The rasterization processing unit 24 determines whether the inspection accuracy has already been determined in the inspection target area (step S105). In a case where the inspection accuracy has been determined (YES in step S105), the overlapping area 81g (see FIG. 10B) exists. Therefore, in this processing example, the higher inspection accuracy is set in a case where the inspection accuracy is different (step S106). Then, the process returns to step S103.

On the other hand, in a case where the inspection accuracy has not been determined (NO in step S105), the overlapping area 81g (see FIG. 10B) does not exist. Therefore, the determined inspection accuracy is set (step S107), and the process returns to step S103.

In a case where the unarranged variable data does not exist (NO in step S103), the inspection target area and the inspection accuracy are notified to the inspection device 40 (see, for example, FIG. 1) (step S108).

In a case where an unprinted page does not exist (NO in step S101), the process ends.

Further, another modification example will be described. That is, a processing example that defines a range in which the inspection accuracy can be designated in a case where a size of the imposition image is changed will be described.

Figure 12:
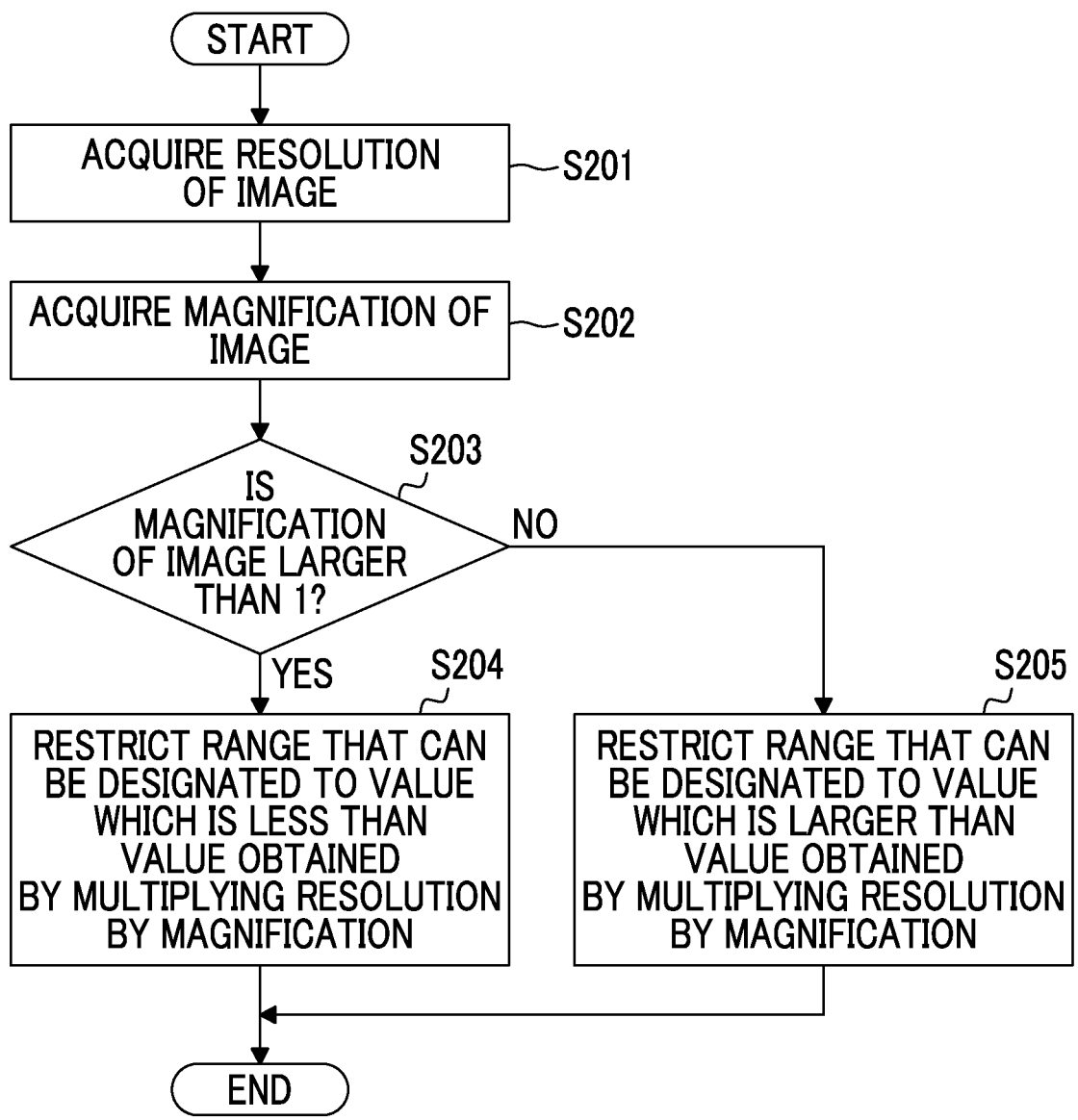
FIG. 12 is a flowchart showing a processing example for setting a range that can be designated for the inspection accuracy.

FIG. 12 is a flowchart showing a processing example for setting a range that can be designated for the inspection accuracy.

In the processing example shown in FIG. 12, the inspection accuracy designation unit 23 (see FIG. 2) acquires the resolution of a target image (step S201), and also acquires the magnification of the target image (step S202). The resolution of the image referred to here is a value of dpi, which is the number of pixels arranged in one inch, and is acquired from attributes of the image. Further, the magnification of the image referred to here is obtained by calculation based on the size of the image acquired from the attributes of the image and the size in the printable area.

Then, it is determined whether or not the acquired magnification is larger than 1 (step S203), and, in a case where the magnification is larger than 1 (YES in step S203), a range in which the inspection accuracy can be designated for the target image is restricted to a value which is less than a value obtained by multiplying the resolution by the magnification (step S204). For example, in a case where the resolution is 600 dpi and the magnification is 2, the designation of "high" is restricted among the inspection accuracy of "high (1200 dpi)", "medium (600 dpi)", and "low (300 dpi)". As a result, "medium" and "low" become a range that can be designated.

The range which can be designated and which is set in this way is reflected in the pull-down menu on the UI screen 60 (see, for example, FIG. 5A) for setting the inspection accuracy.

The range which can be designated is an example of a range that can be designated for inspection accuracy.

In a case where the range which can be designated is less than 1 (NO in step S203), the range in which the inspection accuracy can be designated for the target image is restricted to a value larger than the value obtained by multiplying the resolution by the magnification (step S205). For example, in a case where the resolution is 600 dpi and the magnification is 0.5, the designations of "medium" and "low" are restricted among the inspection accuracy "high (1200 dpi)", "medium (600 dpi)", and "low (300 dpi)". As a result, "high" becomes a range that can be designated.

The range that can be designated is an example of a range that is capable of being designated for inspection accuracy, and is reflected in the pull-down menu.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
   acquire a plurality of variable print items associated with a plurality of elements printed by a print instruction, and associated with position information indicating positions of printable areas of the plurality of elements;
   receive an inspection accuracy designated by a user for each of the plurality of acquired items, wherein the plurality of acquired items comprise a first item and a second item associated with a first element being a first type of data as well as a third item and a fourth item associated with a second element being a second type of data, wherein the inspection accuracies of the first item and the second item are different, and wherein the inspection accuracies of the third item and the fourth item are different; and
   output the received inspection accuracy for each of the plurality of acquired items and the position information associated with each of the plurality of acquired items to an inspection device that inspects each of the plurality of elements of a printed matter by the print instruction.

2. The information processing apparatus according to claim 1,
   wherein each of the inspection accuracies is designated by the user so as to be selected according to a predetermined condition.

3. The information processing apparatus according to claim 2,
   wherein the predetermined condition is whether or not a height of a range occupied by the first element in the printable area is equal to or larger than a threshold value.

4. The information processing apparatus according to claim 2,
   wherein the predetermined condition is whether or not the number of pixels per unit area of the first element in the printable area is equal to or larger than a threshold value.

5. The information processing apparatus according to claim 2,
   wherein the predetermined condition is a type of text in a case where the first element is the text.

6. The information processing apparatus according to claim 2,
   wherein, in a case where there is an area where the first element and the second element overlap, the predetermined condition is whether or not the overlapping area is transparently printed.

7. The information processing apparatus according to claim 1,
   wherein, in a case where there is an area where the first element and the second element overlap and an inspection accuracy of the first element and an inspection accuracy of the second element are different from each other, one of the inspection accuracies of the first element and the second element is set for the overlapping area.

8. The information processing apparatus according to claim 7,
   wherein, in a case where the first element and the second element are transparently printed in the overlapping area, a lower one of the inspection accuracies of the first element and the second element is set.

9. The information processing apparatus according to claim 7,
   wherein, in a case where undercoat printing is performed on the overlapping area, a higher one of the inspection accuracies of the first element and the second element is set.

10. The information processing apparatus according to claim 1,
    wherein a range that is capable of being designated for the inspection accuracy is restricted by a resolution of the first element and a magnification when a size is changed in the printable area.

11. The information processing apparatus according to claim 10,
    wherein, in a case where the magnification when the size is changed in the printable area is a value larger than 1, the range that is capable of being designated is restricted to the inspection accuracy having a value less than a value obtained by multiplying the resolution of the first element by the magnification.

12. The information processing apparatus according to claim 10, wherein, in a case where the magnification when the size is changed in the printable area is a value less than 1, the range that is capable of being designated is restricted to the inspection accuracy having a value larger than a value obtained by multiplying the resolution of the first element by the magnification.

13. The information processing apparatus according to claim 1,
wherein the first item and the second item are texts, and
wherein the third item and the fourth item are images.

14. A printing system configured to:
acquire a plurality of variable print items associated with a plurality of elements printed by a print instruction, and associated with position information indicating positions of printable areas of the plurality of elements;
receive an inspection accuracy designated by a user for each of the plurality of acquired items, wherein the plurality of acquired items comprise a first item and a second item associated with a first element being a first type of data as well as a third item and a fourth item associated with a second element being a second type of data, wherein the inspection accuracies of the first item and the second item are different, and wherein the inspection accuracies of the third item and the fourth item are different; and
output the received inspection accuracy for each of the plurality of acquired items and the position information associated with each of the plurality of acquired items to an inspection device that inspects each of the plurality of elements of a printed matter by the print instruction.

15. A non-transitory computer readable medium storing a program causing an information processing apparatus to:
acquire a plurality of variable print items associated with a plurality of elements printed by a print instruction, and associated with position information indicating positions of printable areas of the plurality of elements;
receive an inspection accuracy designated by a user for each of the plurality of acquired items, wherein the plurality of acquired items comprise a first item and a second item associated with a first element being a first type of data as well as a third item and a fourth item associated with a second element being a second type of data, wherein the inspection accuracies of the first item and the second item are different, and wherein the inspection accuracies of the third item and the fourth item are different; and
output the received inspection accuracy for each of the plurality of acquired items and the position information associated with each of the plurality of acquired items to an inspection device that inspects each of the plurality of elements of a printed matter by the print instruction.

\* \* \* \* \*